(12) United States Patent
Chiproot

(10) Patent No.: US 9,863,561 B2
(45) Date of Patent: Jan. 9, 2018

(54) PIPE CLAMP ASSEMBLY WITH STIFFENING ELEMENT

(71) Applicant: Avi Chiproot, Kfar-Saba (IL)

(72) Inventor: Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 291 days.

(21) Appl. No.: 14/540,121

(22) Filed: Nov. 13, 2014

(65) Prior Publication Data
US 2016/0138740 A1    May 19, 2016

(51) Int. Cl.
F16L 21/00    (2006.01)
F16L 21/06    (2006.01)
F16L 21/02    (2006.01)
F16L 21/03    (2006.01)

(52) U.S. Cl.
CPC ............ *F16L 21/065* (2013.01); *F16L 21/02* (2013.01); *F16L 21/03* (2013.01)

(58) Field of Classification Search
USPC ............. 285/15–17, 252–253, 365, 420–421
See application file for complete search history.

(56) References Cited

U.S. PATENT DOCUMENTS

| | | | | |
|---|---|---|---|---|
| 1,329,522 A * | 2/1920 | Griffin | ................... | B65G 53/52 137/15.08 |
| 1,830,782 A * | 11/1931 | Burnish | ................... | F16L 23/04 285/341 |
| 2,227,551 A * | 1/1941 | Morris | ................... | F16L 21/08 138/99 |
| 3,944,265 A * | 3/1976 | Hiemstra | ................... | F01N 13/1805 24/279 |
| 4,026,586 A * | 5/1977 | Kennedy, Jr. | ................... | F16L 21/005 285/236 |
| 4,165,109 A * | 8/1979 | Foti | ................... | F01N 13/1805 285/148.26 |
| 4,364,588 A * | 12/1982 | Thompson | ................... | F16L 21/06 138/99 |

(Continued)

FOREIGN PATENT DOCUMENTS

| | | |
|---|---|---|
| DE | 202007010155 | 9/2007 |
| EP | 0584784 | 3/1994 |
| GB | 2389395 | 12/2003 |

OTHER PUBLICATIONS

European Search Report EP15193095.5, dated Mar. 23, 2016, 8 pages.

*Primary Examiner* — Aaron Dunwoody
*Assistant Examiner* — Fannie Kee
(74) *Attorney, Agent, or Firm* — Dekel Patent Ltd.; David Klein

(57) ABSTRACT

A pipe clamp assembly includes a band having an inner annular seal element wrappable around a pipe, opposing clamp members extending from the band, and tightening elements for clamping together the clamp members. The tightening elements are positioned at or near opposite ends of each of the clamp members. A stiffening element is constructed of an elongate beam with mounting holes near opposite ends of the beam. The tightening elements pass through the mounting holes of the stiffening element. There are no tightening elements along a length of the stiffening element between the mounting holes.

7 Claims, 2 Drawing Sheets

(56) References Cited

U.S. PATENT DOCUMENTS

| | | | | | |
|---|---|---|---|---|---|
| 4,463,975 | A | * | 8/1984 | McCord | F16L 21/002 285/419 |
| 4,790,574 | A | * | 12/1988 | Wagner | F16L 21/06 285/419 |
| 6,116,659 | A | * | 9/2000 | Wagner | F01N 13/1827 285/373 |
| 6,758,501 | B2 | * | 7/2004 | Amedure | F16L 21/005 285/373 |
| 6,830,268 | B2 | * | 12/2004 | Krausz | F16L 55/172 138/99 |
| 7,052,052 | B2 | * | 5/2006 | Protas | F16L 21/065 285/419 |
| 7,232,160 | B2 | * | 6/2007 | Krausz | F16L 55/172 285/15 |
| 7,396,053 | B2 | * | 7/2008 | Webb | F16L 17/04 24/279 |
| 7,410,192 | B2 | * | 8/2008 | Ignaczak | F16L 21/065 24/20 R |
| 8,408,606 | B2 | * | 4/2013 | Krausz | F16L 21/005 285/373 |
| 8,523,243 | B2 | * | 9/2013 | Geese | F16L 21/005 285/252 |
| 2004/0100091 | A1 | | 5/2004 | Krausz | |
| 2004/0108713 | A1 | * | 6/2004 | Krausz | F16L 55/172 285/53 |
| 2004/0222633 | A1 | * | 11/2004 | Amedure | F16L 21/005 285/373 |
| 2006/0175837 | A1 | * | 8/2006 | Ignaczak | F16L 21/065 285/420 |

\* cited by examiner

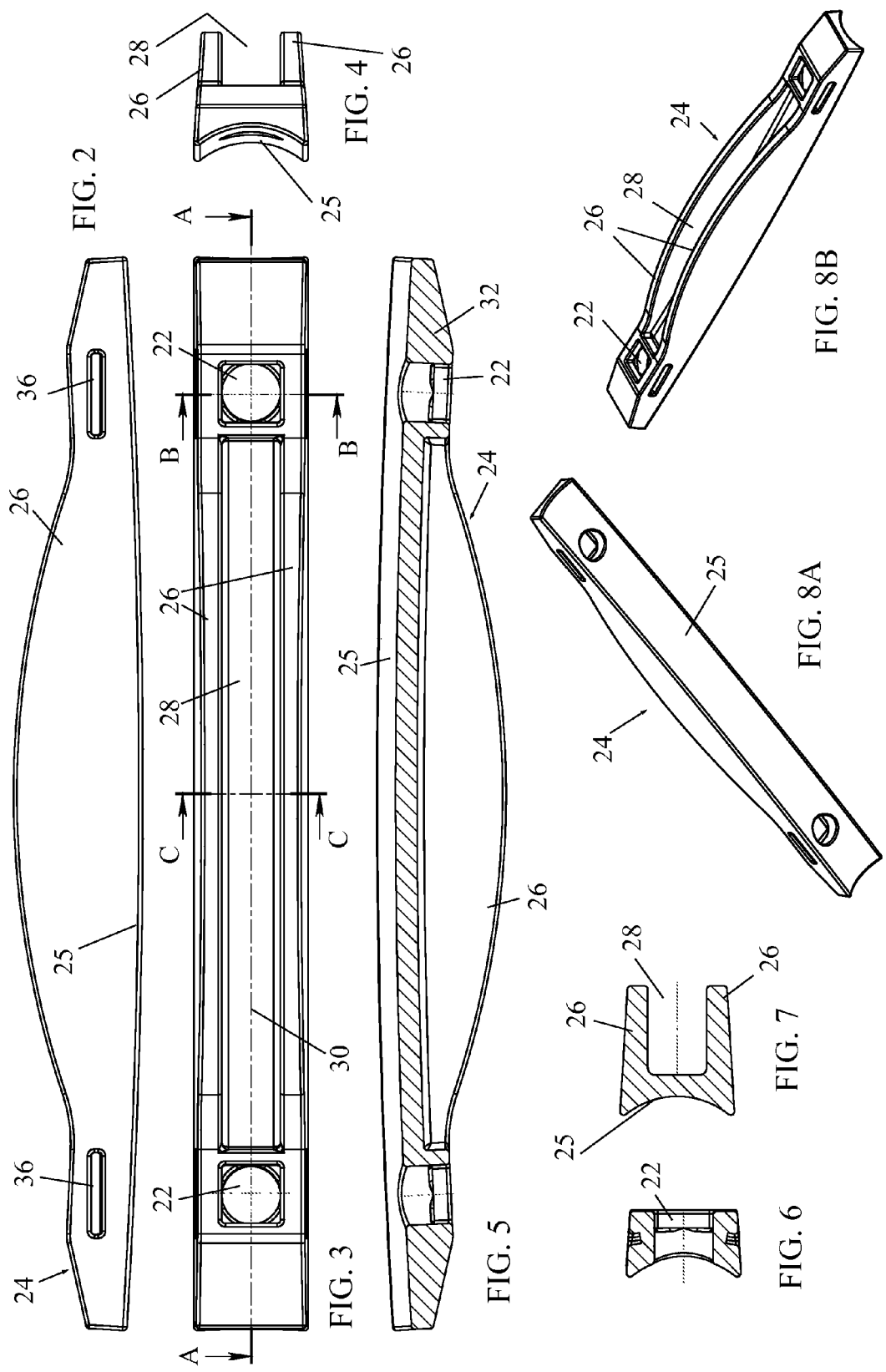

PIPE CLAMP ASSEMBLY WITH STIFFENING ELEMENT

FIELD OF THE INVENTION

The present invention relates generally to pipe clamp assemblies, such as those used to sealingly connect pipes together or to repair breaks or leaks in pipes.

BACKGROUND OF THE INVENTION

Many kinds of removable band-type couplings for pipes exist in the art. It is noted that throughout the specification and claims, the term "pipe" encompasses any kind of generally cylindrical object, and the terms "clamp" and "coupling" are used interchangeably.

For example, one well known type of pipe coupling includes a seal clamp housing. Clamp members are positioned face to face and a tightening element is tightened to press an annular seal element against the outside of the pipe inserted through the seal clamp housing. One end of the tightening element is generally installed in one of the clamp members and the other end must be brought into a socket or opening formed in the other clamp member.

The tightening elements are generally a row of bolts, each cooperating with a nut, which are tightened by a torque wrench and the like. The bolts fit into holes or other kinds of openings before tightening.

Examples of clamps used to repairs holes and longitudinal cracks in water and wastewater pipes are the EZ-MAX line of repair clamps and the VERSA-MAX line of clamps/couplings, both manufactured and distributed by KRAUSZ. VERSA-MAX is a repair coupling and clamp in a single device, capable of repairing holes and cracks and joining pipes with the same or different circumference.

Prior art repair clamps of this type typically have at least 4 tightening elements, that is, four bolts, which must be tightened to effect the seal.

SUMMARY OF THE INVENTION

The present invention seeks to provide novel pipe clamp assembly with a stiffening element that reduces the number of tightening elements needed to achieve a proper seal, as is described more in detail further below. The stiffening element extends between two tightening elements at ends of the clamp and eliminates the need for additional tightening elements between the ends of the clamp. The invention thus makes the tightening operation much quicker and easier.

There is provided in accordance with an embodiment of the present invention a pipe clamp assembly including a band having an inner annular seal element wrappable around a pipe, opposing clamp members extending from the band, tightening elements for clamping together the clamp members, the tightening elements being positioned at or near opposite ends of each of the clamp members, and a stiffening element constructed of an elongate beam with mounting holes near opposite ends of the beam, wherein the tightening elements pass through the mounting holes of the stiffening element and wherein there are no tightening elements along a length of the stiffening element between the mounting holes.

BRIEF DESCRIPTION OF THE DRAWINGS

The present invention will be understood and appreciated more fully from the following detailed description, taken in conjunction with the drawings in which:

FIG. 2 is a front view illustration of the stiffening element;

FIG. 3 is a top view illustration of the stiffening element;

FIG. 4 is an end view illustration of the stiffening element;

FIG. 5 is an upside-down rear view, sectional illustration of the stiffening element, taken along lines A-A in FIG. 3;

FIG. 6 is a sectional illustration of the stiffening element, taken along lines B-B in FIG. 3 at the area for the tightening elements;

FIG. 7 is a sectional illustration of the stiffening element, taken along lines C-C in FIG. 3 at the mid-span of the stiffening element; and FIGS. 8A and 8B are simplified perspective illustrations of the stiffening element.

DETAILED DESCRIPTION OF EXEMPLARY EMBODIMENTS

Figures 1A, 1B:
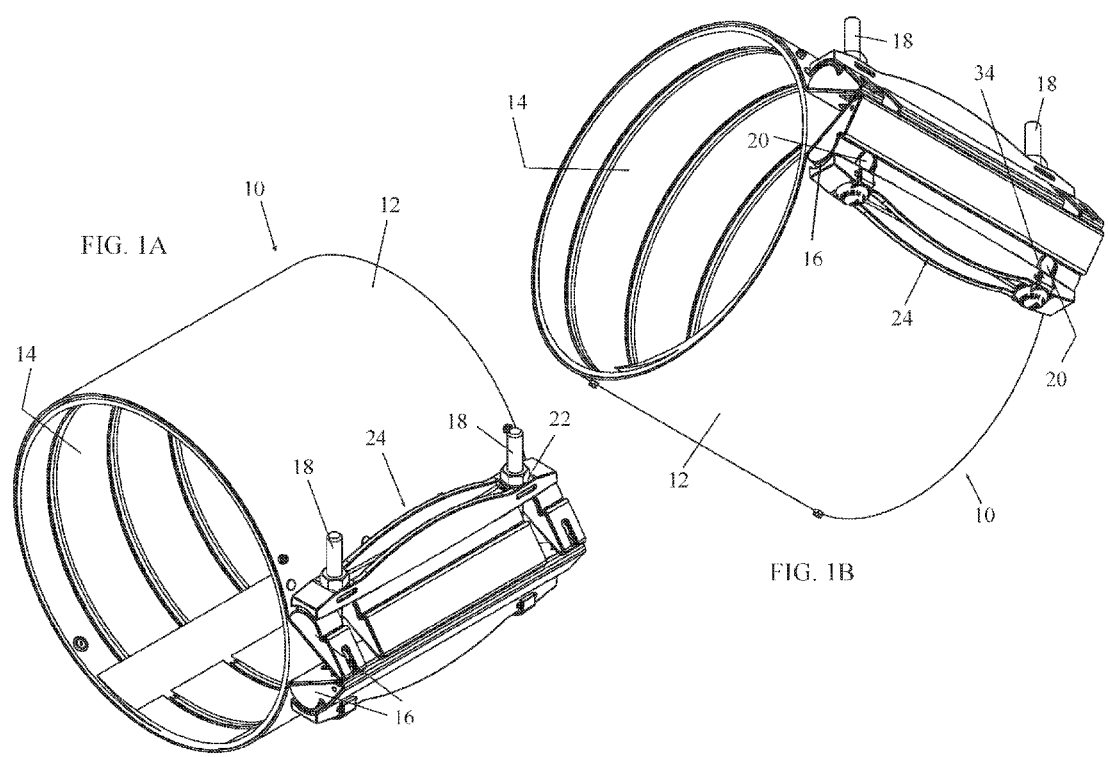
FIGS. 1A and 1B are simplified perspective illustrations of a pipe clamp assembly including a stiffening element, constructed and operative in accordance with a non-limiting embodiment of the present invention.

Reference is now made to FIGS. 1A and 1B, which illustrate a pipe clamp assembly 10, constructed and operative in accordance with a non-limiting embodiment of the present invention.

Pipe clamp assembly 10 includes a band 12 having an inner annular seal element 14 wrappable around a pipe (not shown). Band 12 is typically, but not necessarily, made of metal and annular seal element 14 is typically, but not necessarily, made of an elastomer, such as natural or synthetic rubber.

Opposing clamp members 16 extend from ends of band 12 and are clamped and tightened together with tightening elements 18, such as but not limited to, bolts tightened by nuts. In accordance with a non-limiting embodiment of the present invention, the tightening elements 18 are located at or near opposite ends of clamp members 16. More specifically, tightening elements 18 pass through mounting holes 20 (FIG. 1B) positioned at or near opposite ends of clamp members 16, and also pass through mounting holes 22 of a stiffening element 24.

The structure of stiffening element 24 is now described with reference to FIGS. 2-8B.

Stiffening element 24 is constructed of an elongate beam 25 (FIG. 5) with mounting holes 22 near its opposite ends. The structure of stiffening element 24 between mounting holes 22 is that of a C-channel beam (or U-shaped beam and similar names), meaning the structure includes side walls 26 extending (e.g., perpendicularly) away from beam 25, located along side edges of stiffening element 24 and separated by a gap 28; the cross-section of beam 25 and side wall 26 has the shape of a C or U, as seen in FIGS. 4 and 7. In the illustrated embodiment, the side walls 26 increase gradually in height to the maximum height in the center. In the illustrated embodiment, side walls 26 are continuously curved in the shape of a parabola or cycloid or other curved shapes. The maximum moment of inertia of the side walls is at the center, where the height is at its maximum. Other shapes are also possible, wherein the maximum height is not at the center and wherein the side walls have one or more straight portions.

As seen in FIGS. 2 and 5, beam 25 may be curved convexly pointing away from side walls 26 along the beam's length, that is, along the longitudinal direction of stiffening element 24 (longitudinal axis 30 shown in FIG. 3). The convex curve ensures that stiffening element 24 applies a generally constant compressive force along its longitudinal length when the tightening elements are tightened, as opposed to a straight beam whose middle section does not apply as much compressive force as its end sections when the tightening elements are tightened. As seen in FIGS. 4 and 7, beam 25 may be concavely curved pointing away from side walls 26 in the lateral direction (perpendicular to the longitudinal direction), to accommodate the shape of clamp members 16 (FIGS. 1A-1B).

As seen in FIG. 5, mounting holes 22 may be formed in thickened ends 32 of stiffening element 24. The thickened ends 32 may slope to thinner portions at the extreme ends of stiffening element 24.

In the illustrated embodiment, the head of tightening element 18 is a round bolt head (FIG. 1B). The shank of tightening element 18 may have a non-round (e.g., square) portion which sits in a similarly shaped non-round hole 22 in stiffening element 24, so that tightening element 18 is self-wrenched in hole 22. Alternatively, the head of tightening element 18 may be hexagonal with flat faces for gripping with a wrench or other suitable tool.

A keeper 34 (FIG. 1B) may be provided under the head of each tightening element 18. A preferred construction of the keeper is as described in U.S. Pat. No. 8,408,606 to Krausz and Chiproot. Keeper 34 prevents tightening elements 18 from falling out of their mounting openings 22 in stiffening element 24. Keeper 34 has legs and tabs that are inserted into apertures 36 formed in stiffening element 24. The tabs keep keeper 34 in place in stiffening element 24.

The scope of the present invention includes both combinations and subcombinations of the features described hereinabove as well as modifications and variations thereof which would occur to a person of skill in the art upon reading the foregoing description and which are not in the prior art.

What is claimed is:

1. A pipe clamp assembly comprising:
   a band having an inner annular seal element wrappable around a pipe;
   opposing clamp members extending from said band;
   tightening elements for clamping together said clamp members, said tightening elements being positioned at or near opposite ends of each of said clamp members; and
   a stiffening element constructed of an elongate beam with mounting holes near opposite ends of said beam, wherein said tightening elements pass through said mounting holes of said stiffening element and wherein there are no tightening elements along a length of said stiffening element between said mounting holes;
   wherein said stiffening element between said mounting holes has a C-channel beam structure, comprising side walls extending away from said beam, located along side edges of said stiffening element and separated by a gap, and wherein said side walls have a non-uniform height along a length thereof and said height increases gradually to a maximum height at centers of said side walls, and wherein said beam is curved convexly, pointing away from said side walls, along a longitudinal length of said beam.

2. The pipe clamp assembly according to claim 1, wherein upper edges of said side walls are continuously curved.

3. The pipe clamp assembly according to claim 1, wherein a maximum moment of inertia of said side walls is at the centers of said side walls and is greater than a moment of inertia of said side walls not at the centers.

4. The pipe clamp assembly according to claim 1, wherein said beam is curved concavely, pointing away from said side walls, in a lateral direction perpendicular to a longitudinal length of said beam.

5. The pipe clamp assembly according to claim 1, wherein said mounting holes are formed in thickened ends of said stiffening element.

6. The pipe clamp assembly according to claim 1, wherein said mounting holes have a non-round portion.

7. The pipe clamp assembly according to claim 1, wherein apertures are formed in said stiffening element in which a keeper is received and said keeper is assembled with said tightening elements.

* * * * *